United States Patent [19]

Giers

[11] Patent Number: 4,464,934
[45] Date of Patent: Aug. 14, 1984

[54] PROCEDURE FOR TRANSFERRING MEASURED ANGLE OF UNBALANCE POSITION TO A ROTOR AND MECHANISM FOR IMPLEMENTING SAME

[75] Inventor: Alfred Giers, Rossdorf, Fed. Rep. of Germany

[73] Assignee: Carl Schenck AG., Fed. Rep. of Germany

[21] Appl. No.: 413,410

[22] Filed: Aug. 31, 1982

[30] Foreign Application Priority Data

Sep. 10, 1981 [EP] European Pat. Off. ........ 81107132.3

[51] Int. Cl.³ ............................................. G01M 1/22
[52] U.S. Cl. ...................................... 73/462; 73/464
[58] Field of Search .................................. 73/462, 464

[56] References Cited

U.S. PATENT DOCUMENTS

| 3,678,761 | 7/1972 | Blackburn | 73/464 X |
| 4,063,461 | 12/1977 | Buzzi | 73/462 |
| 4,064,761 | 12/1977 | Giers et al. | 73/462 |

FOREIGN PATENT DOCUMENTS

| 1170160 | 5/1964 | Fed. Rep. of Germany | 73/462 |
| 2548729 | 5/1977 | Fed. Rep. of Germany | . |

Primary Examiner—James J. Gill
Attorney, Agent, or Firm—Connolly and Hutz

[57] ABSTRACT

A procedure for determining the magnitude and angular position of the unbalance of a rotor is described together with an apparatus for accomplishing same. A series of impulses are generated as the rotor rotates, and these impulses relate to the periphery of the rotor. When the unbalance is determined the particular impulse number at the time of that determination is noted, and such impulse is representative of a particular point on the periphery of the rotor.

12 Claims, 3 Drawing Figures

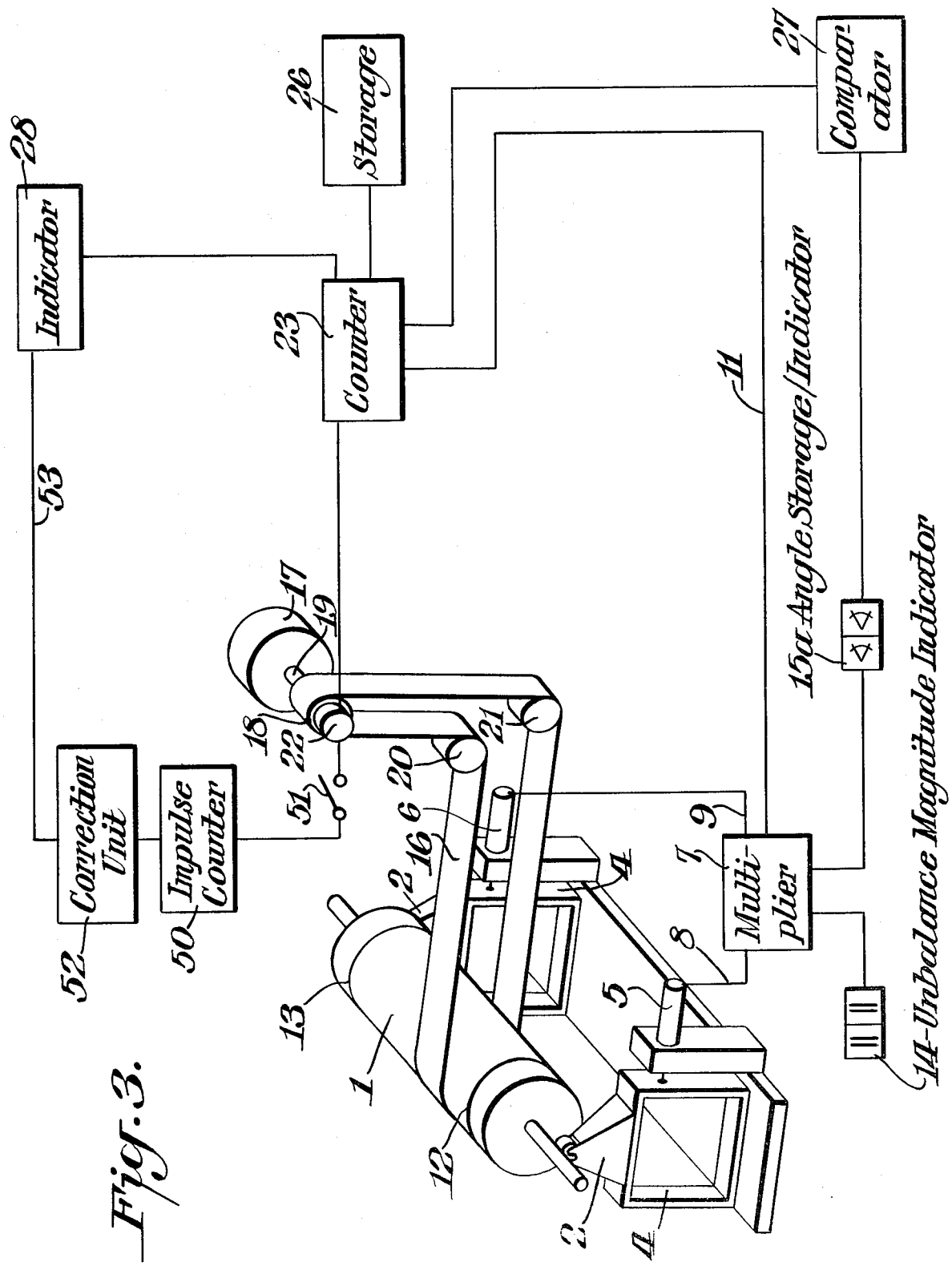

PROCEDURE FOR TRANSFERRING MEASURED ANGLE OF UNBALANCE POSITION TO A ROTOR AND MECHANISM FOR IMPLEMENTING SAME

BACKGROUND OF THE INVENTION

The invention concerns a procedure for transferring a measured angle of unbalance position to a correction plane of a rotor to be investigated, whereby no rotating part of the balancing machine rotates synchronously with the rotor to be investigated (balancing machine without drive shaft) and a mechanism for implementing this procedure.

DE-OS No. 2548729 (U.S. Pat. No. 4,064,761) contains information on a procedure for obtaining and indicating the angle position of the unbalance for balancing machines with an angle indicator, particularly for those with shaftless drive of the body to be balanced, which procedure is characterized thereby that the angle of unbalance can be converted and/or indicated in units of length or in non-dimensional units, each one of which relates to a circumference or a characteristic subdivision of the body to be balanced and which comprise a range of 360°. A mechanism for this purpose is also known, characterized by means for converting the measured angle value by at least one calculation magnitude and/or an indicator device for units of length and/or dimensional units. In the area of balancing, this makes it possible to transfer measured angles of unbalance to a rotor to be balanced, namely thereby that the unbalance is converted into a measure of length, the end of which marks the position of the angle of unbalance when it is placed on the circumference of the body, beginning at a zero point set on the body to be investigated, said angle position being the point where a corresponding correction of the unbalance can take place. It is also possible, as clarified in this disclosure document, to apply a counter tape to a rotating body and to utilize this counter tape for determining the position of the angle of unbalance by means of the indicated conversion value, if said tape is related to a specific zero point on the rotating body.

In respect to bodies which have markings at their circumference already from the production process, or which are provided with a counter tape, it will thereby be possible to transfer the indicated angle of unbalance to the body in question. The cited disclosure document also provides information on how to determine the angle of unbalance by means of a carrying roller instead of with a counter tape to be applied to the body to be investigated, since this roller has a specific relation to the bearing neck of the body to be balanced. However, in this case it will be necessary to provide the carrying roller with an angle scale.

Particularly in regard to rotating bodies with varying diameter of the rotating body proper or the bearing neck of the body, considerable time is required in order to prepare the balancing body proper, e.g. by attaching a counter tape which must be brought into agreement with a zero point to be set on the body to be balanced, or by providing an angle scale on a carrying roller for the rotor to be balanced, which scale generally is not easily accessible and, in addition, cannot always be read without errors. In this case it is also necessay to constantly readjust the ratio between the radius of the carrying roller and the radius of the bearing neck, which necessitates a new indicator scale, on which the angle of unbalance must first be read and then subsequently transferred to the rotating body. Precision deficiencies in the transfer of the angle of unbalance to the body to be investigated will be impossible to avoid due to the several manual procedures of reading and of measuring.

An approach is known for detecting the angle of unbalance of a rotor (Japanese Publication No. 106 598/80, European Publication 0045 505), in which the procedure for slowing down the rotating body is initiated and regulated in accordance with a measurement of the unbalance, so that the rotating body comes to a standstill at an angular position which makes possible a determination of this angle. For this purpose an impulse transmitter is coupled with the rotor at a fixed speed or with respect to a friction drive. From this measuring signal—which is filtered if necessary—impulses, like those of known stroboscope machines are derived, which impulses determine the instant of the onset of the retardation. It is assumed that the rotor traveled a certain total angle from this instant to a standstill, and the total angle is controlled with respect to the coupled impulse transmitter.

Difficulties do arise however with this arrangement, because the slippage is not constant over the long term but depends, for example, upon the moment of gyration of the rotor, the temperature, the moment of braking, and fluctuating friction. For this reason this arrangement is especially plagued by deficiencies in the case of a series of unbalances. Furthermore, it is not possible to find the angle of unbalance again without a new measurement-run if the synchronization has been lost at lower rotational speeds. A synchronization is very often required without a renewed measurement run, however, especially if the rotating body should be taken from its bearings for the purpose of correcting the unbalance.

This arrangement leads to even further difficulties, since there normally is interference in the measurement signal which makes insertion of a filter necessary. This filter causes errors if the frequency of unbalance and the filter frequency, which must be closely in tune, are not exactly synchronized.

SUMMARY OF THE INVENTION

With this background, the purpose of the present invention is to achieve a precise angle transfer of the angle of unbalance values to the rotor proper while at the same time avoiding the cited difficulties, namely without the requirement for a forced synchronization between the rotor and the balancing machine and while also generating a reference signal for the measurement of the unbalance. As a result of the representation of the circumference of the rotor by means of a series of impulses related to an additional mark on the rotor, all errors are eliminated which occur as a result of lack of precision in the application of counter tapes or derive from markings on the body proper. It is not necessary to first reset the body to be investigated to a body provided with markings, e.g. by means of a counter tape. Nor is it necessary to provide it with an additional marking if a carrying roller is used, or the guiding pulley if a belt drive is used, or when the drive motor for the belt drive is utilized as carrier for the impulse generator.

The problem on which the invention is based can also be solved according to another procedure. This solution of the problem behind the invention is particularly characterized thereby that a blank rotor, the circumference of which is represented by means of impulses, makes it possible to perform both the actual measurement of the unbalance, whereby the unbalance is determined according to position and magnitude, as well as a transfer of the measured angle of unbalance to the circumference of the rotor in a correction plane, this without its being rearranged as a countable rotor. By executing this procedure according to the invention and as a result of counting the rotations completed or impulses generated before the stop, it is possible to determine, at any time, the angle of unbalance of the rotor to be investigated, this by means of the stored impulse series that corresponds to the circumference of the rotor.

One execution of the invention is accomplished as follows. By monitoring the intervals between the individual impulses, it is possible to simultaneously monitor the deviation between the actual circumference of the rotor and the rotor circumference represented by the impulses.

Another execution of the procedure according to the invention involves presetting the speed of the rotor. By presetting such speed, it is possible to influence the number of rotations until the rotor stops, and this also allows close monitoring of the transfer process.

A procedure according to the invention herein is executed on a balancing machine which basically consists of a rotor bearing, a drive for the rotor, measurement converters working jointly with the rotor bearings, and an evaluation device for the measurement signals generated from the measurement converter and the signals derived from a reference signal for indication and/or processing of the unbalance according to position and magnitude. Utilizing this mechanism according to the invention, it is no longer necessary to manually perform a new transfer of the values for the angle of unbalance to the rotor on the basis of the indicated values, but the stored impulse number can simultaneously serve for monitoring the correct turning of the rotor in the position of the angle of unbalance.

The further procedure for solution of the problem on which the invention is based can be executed on a still different balancing machine. This mechanism is particularly characterized thereby that an impulse generator can be used, which produces a sequence of impulses which represents, with the aid of a counter, the circumference of correction plane of the rotor to be investigated. Here again a reference signal for the measurement of the unbalance is obtained. Consequently, a mechanism of this nature is particularly suitable when a great number of identical rotating bodies are to be balanced, but it is also applicable to rotating bodies with varying correction planes, if the number of impulses obtained from the impulse sequence of the generator can be adjusted to the circumference of the rotor to be investigated in each procedure. An unequivocal positioning is possible in this execution according to the invention.

Another execution of the invention includes selecting the interval between the impulses whereby an adjustment to the required angle resolution is possible in a particularly simple manner.

An additional execution of the invention includes consideration to the remaining error in the transfer of the angle of unbalance, and this can thus also be taken into consideration in the transfer to the rotor to be investigated.

A further execution of the object of the invention includes the following. The difference is determined between the actual perimeter and that represented by the impulses, by means of a device where a preset impulse number represents the rotor to be investigated, and which makes it possible to consider this difference when the angle position is transferred to the body under investigation.

Still another execution of the object of the invention includes the use of a monitoring device. By means of this monitoring device, deviations between the reference points are unequivocally avoided in case the rotor under investigation should drift, and a constantly reproducible measurement is obtained.

Still another execution of the object of the invention includes use of a turning motor. By means of this execution, a precise transferral of the indicated angle position to the rotor can be obtained.

BRIEF DESCRIPTION OF THE DRAWING

Novel features and advantages of the present invention will become apparent to those skilled in the art from a reading of the following detailed description in conjunction with the accompanying drawing wherein similar reference characters are used to identify similar parts and wherein:

FIG. 3 is a schematic diagram of a balancing machine and a drive for the rotor to be investigated according to the present invention wherein an impulse generator is adjusted to the perimeter of the rotor and assists in transfer of the angle of unbalance position to the rotor investigated.

DETAILED DESCRIPTION OF THE INVENTION

Figure 1:
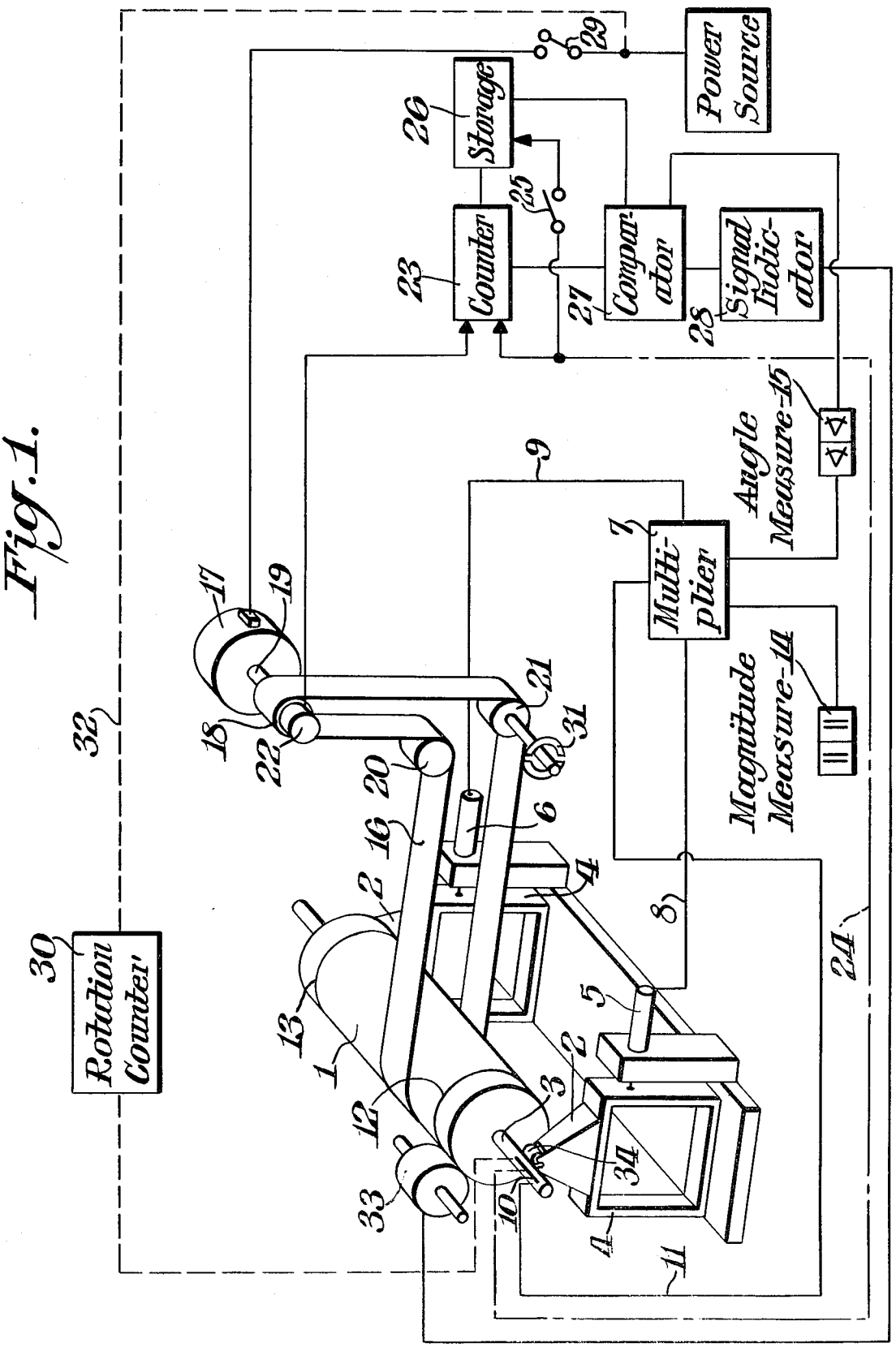
FIG. 1 is a schematic diagram of a balancing machine and a drive for the rotor to be investigated, according to the present invention.

FIG. 1 shows a rotor 1 to be investigated in a balancing machine which has carrying roller bearings 2 for the rotor shaft 3, positioned to allow rotation. Each carrying roller bearing 2 is supported on a unit 4 for each of the rotor shaft ends 3. Measurement converters 5,6 convert into electrical signals those vibrations or forces which occur at units 4 as a result of unbalance of the rotor. Simultaneously, an additional signal is derived as a reference signal from a characteristic position of the rotor, in the execution example a groove 10 in the rotor shaft 3. The information from the measurement converters is fed via lines 8,9 into an evaluation device 7, e.g. a multiplier device, while a reference signal is also fed into the multiplier device via an additional line 11. From this information, the magnitude of the unbalance and the angle of unbalance for each correction plane 12,13 is determined in the multiplier device, and indicated e.g. separately for each correction plane in a device 14 for magnitude measurement, which is reversible in the execution example, and also in a reversible device 15 for measurement of the angle. The output from the multiplier 7 of the angle measuring device 15 may be direct current or impulses or other techniques known in the art. Hence, the transfer of the values from the multiplier 7 is not limited to means of direct current or impulses and other known potential transfer methods for measurement data can also be used. Also, transfer from angular measurement device 15 to comparator 27 may be by direct current or impulses or other known techniques in the art.

The rotor 1 to be investigated is driven by means of a belt 16, which partially loops around the rotor (for the sake of clarity, the belt was turned by 90° into the horizontal). The belt 16 is driven by a drive motor 17, which has a drive disc 18 on a shaft 19, via a tension pulley 20 and a deflection pulley 21. Connected with the drive disc 18 is an impulse generator 22, which feeds one impulse sequence per rotation of the drive disc 18 into a counter 23, in which the impulses are counted. In dependence of the groove 10, the counting of the impulses in the counter 23 is influenced via an impulse line 24; the counter develops a forward count, and the information arriving via the impulse line 24 is evaluated as stop-start information. This means that for every occurring impulse from the line 24, the number of impulses in the counter 23 is fed into a storage 26, the counter 23 is reset on zero, and is restarted for counting. The circumferential ratio between disc 18 and rotor 1 is arbitrary, and the total number of pulses counted at 23 (one for each revolution of disc 18) is representative of the circumference of rotor 1 since the total count at 23 ends when line 24 senses one complete revolution of rotor 1. As long as no additional information arrives into the storage 26, e.g. due to the discontinuation of the measurement process, the above described procedure is repeated via the impulse line 24 at the next stop-start impulse.

After completion of the measuring procedure, a switch 25 is opened, and the number of impulses in the storage 26 is stored in a form that can be further processed.

The device for angle measurement, 15, and the counter 23 and/or the storage 26 are connected via a comparison unit 27. In this comparison unit 27, the analog or digital information concerning the angle of unbalance is then related to the number of impulses in the storage 26, which represents the periphery of the rotor 1 to be investigated, namely at a correction plane 12 or 13. During the slow-down of the rotor 1 to be investigated, the referenced angle of unbalance is continuously compared with the content of the counter 23. When the two angles coincide, the rotor is in the determined angle of unbalance position. The correlation can be indicated, according to the nature of the installation, by means of an indicator 28, e.g. a signal lamp. According to the invention, the signal lamp can be replaced with a differential angle indicator, indication of the angle position, and optical comparison thereof.

As noted above, the counter 23 is always set at zero when its contents show the same number of impulses as the contents of the storage 26.

The comparison unit 27 has two purposes, the first of which is to make a reference between the angle of unbalance and the number of impulses in the memory. For example, if the angle of unbalance is y and the number of impulses stored in the memory 26 is z and if the total is determined, e.g. with the final indication of a 10 volt measurement device, then the result is a reference magnitude a:

$$a = \frac{y \text{ (volt)}}{10 \text{ (volt)}} \cdot z$$

or, if the angle is referenced in degrees on a 360° scale:

$$a = \frac{y \text{ (degrees)}}{360 \text{ (degrees)}} \cdot z$$

Hence in the comparison unit 27, a reference magnitude a is obtained which is generated from the information on the angle of unbalance y and is referenced to the number z of impulses in memory 26.

The second purpose of the comparison unit 27 is to compare the magnitude a with the variable content of the counter 23. When the referenced magnitude corresponds to the contents of the counter 23, an indicator 28, e.g. a signal lamp, will show this correlation. Also, as stated above, differential angle indicators with indication of the angle position and optical comparison thereof may be used in place of the signal lamp.

After completion of the measurement procedure, the current supply to the drive motor 17 can be interrupted by means of an on/off switch 29. When the drive motor 17 is deactivated, a rotation counter 30 is simultaneously activated, which is connected with a braking device 31 for stopping the rotor 1 to be investigated. If a preset nominal number of rotations on the rotation counter 30 should be exceeded for the time period between the activation of the switch 25 and the stopping of the rotor 1 to be investigated, a command line 32 reactivates the on/off switch 29, the drive motor 17 is supplied with current, so that a renewed measurement can take place.

Controlled by the indicator 28 for the differential angle of the angle of unbalance to be transferred, a stepping motor 33, which can be brought into working contact with the periphery of the rotor to be investigated, will continue to turn the rotor 1 to be investigated, until the indicator 28 shows zero, whereby the rotor 1 to be investigated is correspondingly positioned and arrested, and processed by a processing tool which is not represented.

Instead of the belt drive represented in FIG. 1, the drive may also be accomplished by means of carrying rollers 34 of the carrying roller bearing arrangement, in which case the impulse generator 22 would have to be correspondingly located on the carrying roller 34. The tension pulley 20 or the deflection pulley 21, or the drive motor 17, could also serve as carriers for the impulse generator 22.

The generation of the reference signal for determining the unbalance from magnitude and angle position is not limited to the sensing of a groove 10 on the rotor shaft 3 as represented in FIG. 1, but a characteristic on the exterior surface of the rotor 1 to be investigated can also be utilized for the generation of the reference signal. Thereby, the generation of this signal may be affected by means of photoelectric, magnetic, or similar sensing.

Figure 2:
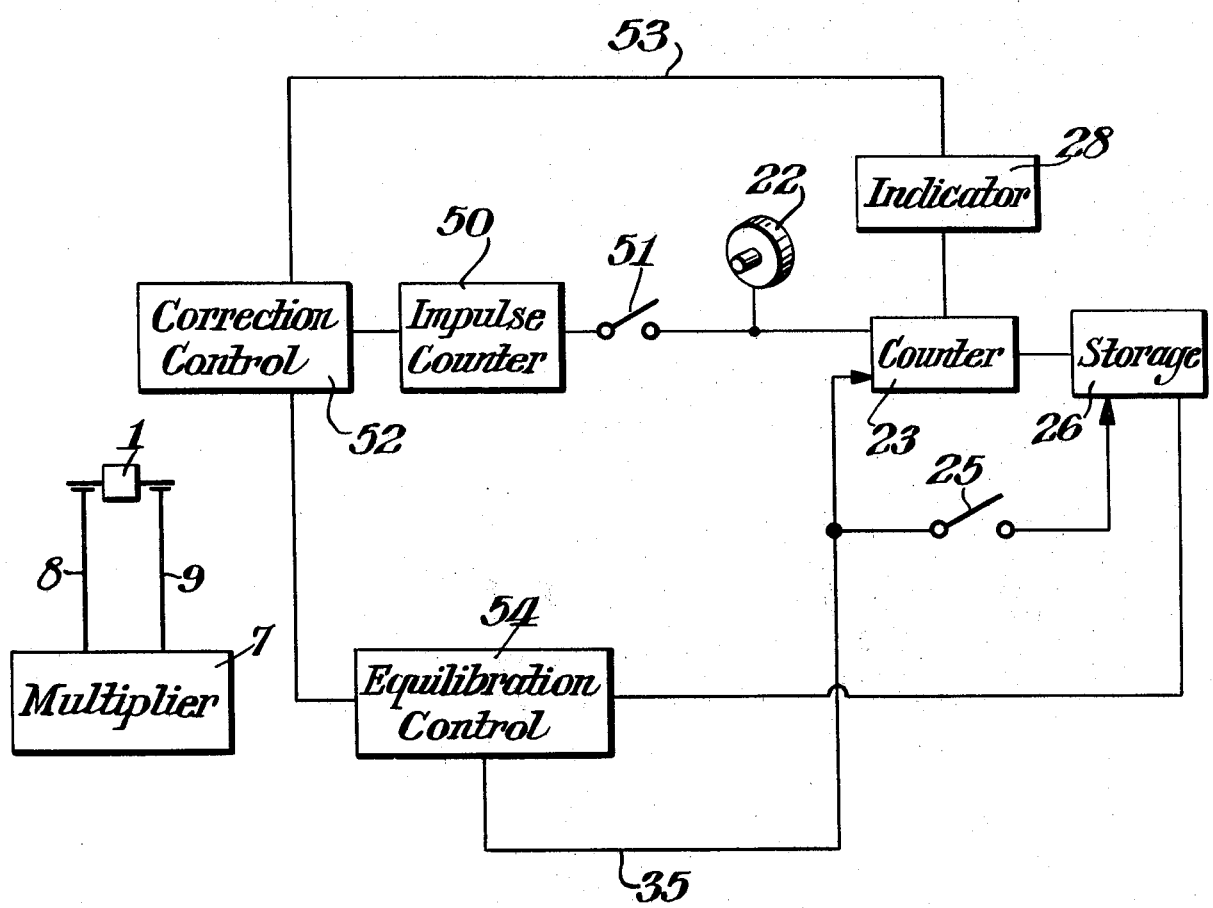
FIG. 2 is a schematic block diagram illustrating an arrangement according to the present invention wherein the angle error accumulated during slowdown of the rotor is computed.

As shown in FIG. 2, during the slow-down of the rotor 1 to be investigated, the number of impulses to the stop of the rotor 1 to be investigated can be stored by an additional impulse counter 50, which is activated after the measuring procedure by means of an additional switch 51. Thereby, the angle error accumulated during the slow-down is fed into the indicator 28 and the actual zero position is corrected, i.e. the deviation between the actual periphery of the rotor and the periphery determined by means of impulse counting, namely via a correction unit 52 and a line 53. The correction unit 52 obtains a correction value which is proportional to the contents of the storage 50 and a preset, generally empirically determined constant.

The correction unit 52 is further influenced by an equilibration unit 54, in which the time progression of the impulse sequence from storage 26 is compared with the time distance of the stop/start impulses occurring on line 35.

FIG. 3 represents yet another possibility according to the invention to transfer the angle of unbalance by representing the periphery of the correction plane 12 or 13 of the rotor 1 to be investigated, namely by means of impulses, whereby the said impulses have a constant distance from one another, preferably smaller than three angle degrees.

In FIG. 3, the rotor 1 to be investigated is driven by a belt 16, which partially loops around the rotor (for the sake of clarity, the tape was displaced by 90° into the horizontal). The belt 16 is driven by a drive motor 17, which has a drive disc 18 on a shaft 19, via a tension pulley 20 and a deflection pulley 21. Connected with the drive disc 18, there is an impulse generator 22, which feeds an impulse sequence into a counter 23 for each revolution of the drive disc 18, and the impulses are counted in this counter.

A fixed number is stored in the storage 26, corresponding to the number of impulses representing the periphery of the rotor 1 to be investigated, namely in the correction plane 12,13. After reaching the measurement speed, the status of the counter 23 is continuously compared with the contents of the storage 26. When parity occurs, the counter 23 is set back and started again, and this reset signal is simultaneously fed into the evaluation unit 7. There, the unbalance is represented in terms of position and magnitude of the angle, on the basis of the information arriving via lines 8 and 9 together with the information arriving via line 11, and the magnitude of the unbalance is indicated on the indicator 14 or directly subjected to further processing.

The angle information from the evaluation unit 7 is stored in an angle storage 15a and is compared with the contents of the counter 23 via the comparison unit 27.

Prior to the initiation of the braking process for the rotor 1 to be investigated, the magnitude of the unbalance is stored in the indicator 14 and the angle information in the indicator 15a, and the additional switch 51 is closed at the moment this storage is accomplished. During the slow-down of the rotor 1 to be investigated, the number of impulses up to the stop of the rotor 1 to be investigated can be stored by an additional impulse counter 50, which is activated after the measuring process via the additional switch 51. Thereby, the angle error cumulated during the slow-down is fed to the indicator 28 via a correction unit 52 and a line 53, and the actual zero position is thus corrected, i.e. the deviation between the actual periphery at the equalization planes of the rotor to be investigated, and the periphery represented by means of impulse counting.

After the stop of the rotor to be investigated, said rotor is turned until the indicator 28 shows the zero position of the counter 23. Thereby, the unbalance is located in the angle position required for the correction.

In the case of even slow-down of the rotor 1 to be investigated, the necessary angle correction value can also be obtained without the counter 50. In this case, an empirical value for the angle correction is simply preset for the correction unit 52.

For purposes of compensating for varying slippage in start-up and braking of the rotor 1 to be investigated, a weighted mean value from the number of impulses in the counter 23 during the start of the rotor and the number of impulses in the counter 23 during the braking is stored in the storage 26. In the weighting, the differences in the magnitude of the slippage during start-up and braking should preferably be taken into consideration.

What is claimed is:

1. A procedure for transferring a measured angle of unbalance to a correction plane of a rotor to be investigated, whereby no rotating part of the balancing machine runs synchronously with the rotor to be investigated, characterized thereby that an impulse generator located on a rotating part of the balancing machine and coupled with the rotor being investigated generates a sequence of impulses related to the rotation of said part, interrupting by a stop-start impulse derived from the rotor the counting of the impulse sequence for each revolution of the rotor being investigated, storing the number of impulses generated for each revolution of the rotor, correlating a measured angle of unbalance position of the rotor being investigated to the counted and stored impulses of the impulse sequence corresponding to the periphery at a correction plane of the rotor being investigated, and storing such impulse count for further processing.

2. A procedure for transferring a measured angle of unbalance to a correction plane of a rotor to be investigated, whereby no rotating part of the balancing machine runs synchronously with the rotor to be investigated, characterized thereby that an impulse generator located on a rotating part of the balancing machine and coupled with the rotor being investigated produces an impulse sequence counting the number of impulses so generated, stopping and starting the impulse sequence when the number of pulses counted corresponds to one revolution of the rotor being investigated, the stopping and starting of the impulse sequence simultaneously serving as a reference signal for storable processing of measurement converter signals containing the magnitude and angle position of the unbalance, relating the angle of unbalance position obtained in this manner to the new counting and storing of impulse in the impulse sequence which occurs with each revolution of the rotor and corresponds to the periphery at a correction plane of the rotor, and storing the count at the angle of unbalance position in such a form that it can be further processed.

3. A procedure according to claim 2 characterized thereby that the number of revolutions of the rotor being investigated is counted until the rotor stands still.

4. A procedure according to claim 2 characterized thereby that during slow-down of the rotor being investigated there is an additional counting of the generated impulses.

5. A procedure according to any of claims 1 or 2 characterized thereby that the speed of the rotor during the measurement and transfer procedure is predetermined and monitored.

6. A device for transferring a measured angle of unbalance position to a rotor to be investigated with the aid of a balancing machine having no rotating part which runs synchronously with the rotor to be investigated, the balancing machine basically consisting of a rotor bearing means, a drive for the rotor, measurement converters co-functioning with the rotor bearing means, and an evaluation device for the measurement signals delivered from the measurement converters and the signals derived from a reference signal for indication and/or further processing of the unbalance according to its position and magnitude, characterized thereby that an impulse generator is located on a rotating part of the balancing machine and coupled with the rotor to be investigated, the impulse generator generating an impulse sequence when the rotor revolves, a counter for counting the impulses of the sequences and adapted to be set back to zero for each revolution of the rotor, means for storing the number of impulses counted for each revolution of the rotor, and a comparison unit for comparing the measured angle of unbalance position with the stored counter impulses representing the periphery of the rotor at a correction plane.

7. A device according to claim 6 characterized thereby that a revolution counter is provided for counting each revolution of the rotor.

8. A device according to claim 6 characterized thereby that information concerning the time difference between the course of an impulse sequence and the time difference between the start-stop impulses is fed into a control unit, and that the angle deviation between the actual periphery and the periphery as represented by an impulse sequence of the periphery of the rotor is obtained in the control unit, and that on the basis of this value, the further processable impulses are corrected for the purpose of turning the rotor into the angle of unbalance position.

9. A device for transferring a measured angle of unbalance position to a rotor to be investigated with the aid of a balancing machine having no rotating part which runs synchronously with the rotor to be investigated, the balancing machine basically consisting of a rotor bearing means, a drive for the rotor, measurement converters co-functioning with the rotor bearing means, and an evaluation device for the measurement signals derived from a reference signal for indication and/or further processing of the unbalance according to its position and magnitude, characterized thereby that an impulse generator is located on a rotating part of the balancing machine and coupled with the rotor to be investigated, the impulse generator producing an equidistant impulse sequence, a counter for counting the impulses of the sequence and adapted to be set back to zero after a predetermined number of impulses, means for producing a set back signal for the counter, the set-back signal simultaneously serving as a reference signal of the evaluation device for the determination of the magnitude and angle position of the unbalance, and means for comparing the angle position of the unbalance obtained from the combination of the reference signal and the measurement signal with the stored counter impulses representing the periphery of the rotor.

10. A device according to claim 9 characterized thereby that a signal concerning the difference between adjustable impulse number and actual periphery of the rotor is fed into a control unit and that the angle error is derived therefrom in the control unit, and that, on the basis of this value, the stored, further processable number of impulses is corrected for the purpose of turning the rotor into the angle of unbalance position.

11. A device according to any one of claims 6 or 9 characterized thereby that the impulse interval between the individual impulses representing the periphery of the rotor being investigated is less than three angle degrees.

12. A device according to any one of claims 6 or 9 characterized thereby that information is derived from the number of impulses stored in such a form that they can be further processed, and that a turning motor is provided to which this information is fed, the turning motor turning the rotor into the position corresponding to the angle position of the unbalance, and means for deactivating the turning motor when this angle position has been reached.

* * * * *